United States Patent
Katoh et al.

(10) Patent No.: US 6,409,074 B1
(45) Date of Patent: Jun. 25, 2002

(54) FLUX COMPOSITIONS FOR BRAZING ALUMINUM, THEIR FILMS AND BRAZING METHOD

(75) Inventors: Haruzo Katoh; Takashi Watsuji; Ken Matsumura, all of Osaka (JP)

(73) Assignee: Toyo Aluminium Kabushiki Kaisha, Osaka-fu (JP)

( * ) Notice: Subject to any disclaimer, the term of this patent is extended or adjusted under 35 U.S.C. 154(b) by 0 days.

(21) Appl. No.: 09/616,079

(22) Filed: Jul. 13, 2000

Related U.S. Application Data

(62) Division of application No. 09/373,542, filed on Aug. 13, 1999, now Pat. No. 6,203,628.

(30) Foreign Application Priority Data

| Aug. 20, 1998 | (JP) | 10-234488 |
| Aug. 27, 1998 | (JP) | 10-241663 |
| Oct. 9, 1998 | (JP) | 10-288490 |
| Jun. 7, 1999 | (JP) | 11-159887 |

(51) Int. Cl.$^7$ .......................... B23K 31/02; B23K 35/34
(52) U.S. Cl. .................. 228/223; 228/224; 148/23; 148/24
(58) Field of Search .................. 228/207, 223, 228/224, 248.1, 248.5; 148/23, 24, 25

(56) References Cited

U.S. PATENT DOCUMENTS

| 4,358,485 A | * | 11/1982 | Kern et al. |
| 4,906,307 A | * | 3/1990 | Fujiyoshi |
| 5,173,126 A | * | 12/1992 | Ogura et al. |
| 5,360,158 A | | 11/1994 | Conn et al. |
| 5,549,927 A | * | 8/1996 | Cottone et al. |
| 5,690,271 A | * | 11/1997 | Dudel |
| 5,755,374 A | * | 5/1998 | Prigmore |
| 6,019,856 A | * | 2/2000 | Born et al. |
| 6,203,628 B1 | * | 3/2001 | Katoh et al. |
| 6,234,377 B1 | * | 5/2001 | Teshima et al. |

FOREIGN PATENT DOCUMENTS

| EP | 0980738 A2 | * | 2/2000 |
| GB | 2 027 617 A | | 2/1980 |
| JP | 54 043853 | | 4/1979 |
| JP | 06 285682 | | 10/1994 |
| JP | 8-229695 | | 9/1996 |
| JP | 2681390 | | 8/1997 |
| JP | 02000141083 A | * | 5/2000 |

* cited by examiner

Primary Examiner—Tom Dunn
Assistant Examiner—Kiley Stoner
(74) Attorney, Agent, or Firm—Nixon & Vanderhye

(57) ABSTRACT

A flux composition for brazing aluminum, comprising a fluoride flux, at least one selected from a butyl rubber and a petroleum resin, and a solvent. The novel flux composition has excellent processing properties and provides brazed areas (fillets) with good appearance.

5 Claims, 1 Drawing Sheet

EXAMPLE I-1

COMPARATIVE EXAMPLE I-2

EXAMPLE I-1    COMPARATIVE EXAMPLE I-2

EXAMPLE II-1    COMPARATIVE EXAMPLE II-2

FLUX COMPOSITIONS FOR BRAZING ALUMINUM, THEIR FILMS AND BRAZING METHOD

This application is a divisional of U.S. Ser. No. 09/373,542 filed Aug. 13, 1999 now U.S. Pat. No. 6,203,628B1.

BACKGROUND OF THE INVENTION

The invention relates to flux or paste compositions useful for brazing aluminum materials to be jointed. The term "aluminum" referred to herein and in the appended claims means aluminum and its alloys otherwise specifically described.

In order to braze aluminum, brazing sheets are frequently used. The brazing sheets used comprise cores of alloys such as 3003 alloy, 3N03 alloy or the like clad with brazing materials such as 4343 alloy or 4045 alloy on either or both surfaces thereof. These numbers of four ciphers are as specified in JIS.

In case aluminum is brazed, it is essential to coat a flux to an area to be brazed. Generally, a suspension comprising a flux in a medium such as water is coated by spraying or using any other means and dried before a brazing step. However, the spraying of the suspension may scatter the flux over undesirable areas, which is not preferable to operating atmosphere and health. When water is used as the medium, the flux is readily peeled off and dropped after completely drying and therefore, it is impossible to store and transport for a long period before the brazing step. And, processing, assembly and the like are also impossible. On the other hand, when the drying before the brazing step is incomplete, water content in a brazed area is increased which may lower a brazing property and produce defects in the brazed area. Moreover, when water is used as the medium, the flux is not well adhered to the brazing sheet. And, it is not evenly coated. Excess flux in areas to which much amounts of the flux are adhered may form gray or white stains, while areas to which less amounts of the flux are adhered may have an insufficient brazing property.

For overcoming the problems mentioned above, a method comprising adding a water soluble resin as a binder was proposed as disclosed in JP 6285682A. This method is not commercially valuable since the reaction of the binder with the flux during brazing makes brazed areas dark. Even if the water soluble resin was used, the resultant film was readily peeled off due to its poor film-forming property. Processing and assembly after the coating of the flux were substantially impossible.

SUMMARY OF THE INVENTION

An object of the present invention is to provide a new flux composition for brazing aluminum, its film and a brazing method having the following advantages:

(1) Since the flux composition of the present invention has an excellent adhesion to an aluminum brazing sheet, the resultant film after drying is not readily peeled off or dropped. Therefore, various operations including processing and cutting can be easily carried out after coating the flux composition.

(2) Since a butyl rubber and a petroleum resin used in the flux composition of the present invention are thermally decomposed by elevating the temperature during brazing, brazed areas (fillets) have good appearance and the change into dark color and the production of white residues do not occur.

(3) Since the flux composition of the present invention can be dried at room temperature by selecting a suitable organic solvent, the increase in costs is prevented. And, since the satisfactory film is obtained even after drying, dusts and the like which are not preferable for operating atmosphere are not produced.

(4) Since the flux composition of the present invention has a suitable viscosity by controlling an amount of a solvent and other factor(s), it can be applied to members having complicated forms and members having irregular and/or indented surfaces.

(5) The brazing method of the present invention can be carried out in existing plants without using a special apparatus or device.

(6) When the flux composition of the present invention containing a static agent is used, an electrostatic coating is possible and the composition can be adhered to a substrate without the production of dusts and the like.

DETAILED DESCRIPTION OF THE PREFERRED EMBODIMENTS

Figure 1:
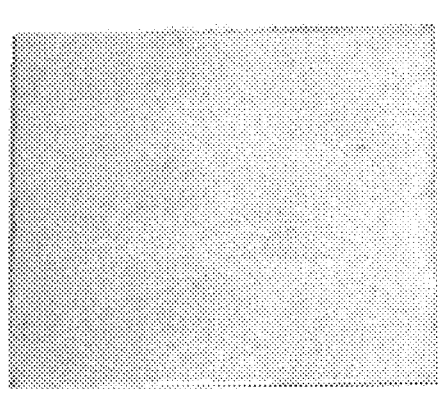
FIGS. 1 to 2 are photographs showing conditions of residual carbon on coated panels of Example I-1 and Comparative Example I-2; and Example II-1 and Comparative Example II-2, respectively.
Figure 1:
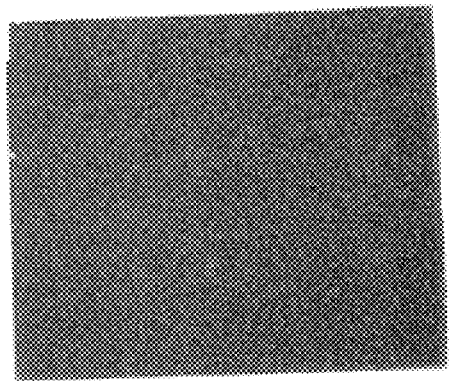
Figure 2:
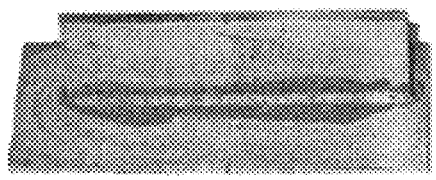
Figure 2:
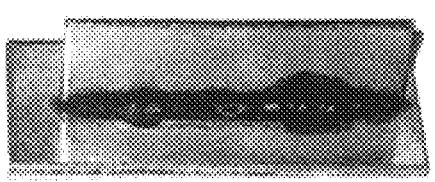

The 1st preferred embodiment:

1. A flux composition for brazing aluminum comprising 100 parts by weight of a fluoride flux, 1 to 50 parts by weight of a butyl rubber and/or a petroleum resin and 30 to 600 parts by weight of an organic solvent;

2. A film prepared by coating at least a part of a surface of an aluminum brazing sheet with the above flux composition and then drying;

3. A method for brazing an aluminum material comprising coating at least a part of a surface of an aluminum brazing sheet with the above flux composition, drying and then brazing the coated aluminum brazing sheet to the aluminum material.

The 2nd preferred embodiment:

1. A paste composition for brazing aluminum comprising (a) 30 to 70% by weight of a metallic powder for brazing, (b) 2 to 30% by weight of a fluoride flux and (c) 1 to 15% by weight of a butyl rubber and/or a petroleum resin, the balance being substantially an organic solvent, provided that the total is not more than 100% by weight;

2. A film prepared by coating at least a part of a surface of an aluminum material with the above paste composition and then drying;

3. A method for brazing aluminum materials comprising coating at least a part of a surface of one of the aluminum materials with the above paste composition, drying and then brazing the coated aluminum material to another aluminum material.

Various conditions with respect to the above preferred embodiments of the present invention will be explained below in detail.

fluoride flux:

Examples of the fluoride flux used in the present invention include fluoride fluxes such as $AlF_3$—KF, $KAlF_4$—$K_3AlF_6$, $K_3AlF_6$ and $KAlF_4$. Particularly, a mixture of $K_3AlF_6$ and $KAlF_4$ commercially available as "Nocolok (trade name)" from Alcan Aluminum Limited, Canada is preferable.

Its amount in the paste composition is about 2 to 30% by weight, preferably about 5 to 20% by weight. When the amount is less than 2% by weight, the flux cannot show its function sufficiently. On the other hand, the amount of over 30% by weight is a surplus leading to the increase in costs.

resin binder:

As a resin acting as a binder in the flux or paste composition of the present invention, a butyl rubber of a copolymer of isobutylene and isoprene, preferably having a molecular weight ranging from 250,000 to 550,000 and/or a petroleum resin can be used. Its amount is preferably 1 to 50 parts by weight, more preferably 2 to 30 parts by weight with respect to 100 parts by weight of the flux. The amount of less than 1 part by weight is not preferable since when the flux composition is applied to an aluminum material, it runs down due to its poor viscosity and its adhesion to the aluminum material becomes inferior. On the other hand, the amount of over 50 parts by weight is a surplus leading to the increase in costs. As the petroleum resin, one or more selected from $C_5$ petroleum resin, $C_9$ petroleum resin, and $C_5C_9$ copolymer petroleum resin can be used, $C_5C_9$ copolymer petroleum resin being particularly preferable. Preferable molecular weight of the petroleum resin is about 600 to 2,000.

organic solvent:

Any organic solvents can be used in the present invention as long as the butyl rubber and/or the petroleum resin are soluble therein. For example, toluene, hexane, octane, cyclohexane or a mixture thereof can be used.

In case of the flux composition, its amount is suitably determined according to the necessary viscosity and other factors, but it is about 30 to 600 parts by weight, preferably about 50 to 450 parts by weight. When the amount is less than 30 parts by weight, the viscosity of the composition is too high and therefore, it is difficult to evenly mix the composition. On the other hand, when the amount is over 600 parts by weight, the viscosity of the composition becomes too poor and therefore, the resultant film may sag and a solution may be separated.

In case of the paste composition, the organic solvent is suitably added to adjust the viscosity of the composition. Generally, its amount is 0.1 to 67% by weight, preferably 10 to 50% by weight.

metallic powder for brazing:

A metallic powder for brazing usable in the present invention is powder based on aluminum. For example, a powder of an aluminum-silicon alloy, a mixture of an aluminum powder and a silicon powder, a mixture of an aluminum powder and a zinc powder, a powder of an aluminum-zinc alloy, a powder of a ternary alloy such as Al—Si—X (X=Cu, Zn, etc.) and the like can be used. These powders can be obtained according to any conventional methods such as an atomization, a pulverization, a rotary disc method, a cavitation method and a melt spinning method, or their combination. Of course, commercially available products can be used as such. The metallic powder has any form such as spheres, flats, plates, teardrops, needles, ellipsoids, monolithic and the like. The preferable aluminum powder is that obtained by atomizing in an argon or nitrogen gas. Oxygen content in the aluminum powder is varied depending on particle size and form of the powder and it is preferably 1.5% by weight or less. If it is over 1.5% by weight, an oxide film is firmly attached on an aluminum powder so that the aluminum powder may not be melt or its flowability may be impaired. The aluminum powder has preferably an average particle size of 2 to 150 µm, desirably 5 to 50 µm. The aluminum powder having an average particle size of less than 2 µm is not preferable since its oxygen content will be increased with high possibility and costs are also increased. On the other hand, the aluminum powder having an average particle size of over 150 µm is not preferable since the resultant film after coating is too thick and the powder may not be evenly distributed in the composition. Amount of silicon contained in the metallic powder for brazing is suitably 5 to 30% by weights preferably 5 to 17% by weight. Silicon may be present singly, i.e. as a mixture with an aluminum (mixed powder) or in the form of an alloy with aluminum (alloy powder). This means that when silicon is or to be alloyed with aluminum in the above composition, such an alloy has a low melting point and a good flowability in a molten state. If necessary, one or more additional elements such as Cu, Mg, Bi, Sb, Ba and the like can be added in an amount of about 5% by weight or less based on 100% of the total metal. And also, if necessary, Zinc can be added in an amount of about 50% by weight or less, preferably 40% by weight or less based of the total metal (total metallic powder). These additional elements may be present singly or in the form of an alloy. When aluminum and silicon are used as their mixture, a pure aluminum powder having the purity of 99.0% by weight or more, desirably 99.7% by weight or more and a silicon powder having the purity of 90.0% by weight or more, desirably 97.0% by weight or more are particularly used. If the powder having poor purity is used, a content of iron of an impurity may be increased and therefore, an anti-corrosive property after brazing may be lowered. Particle size of silicone powder may be smaller than that of the aluminum powder as described above. Silicon powder having an average particle size of about 0.1 to 150 µm can be used. The silicon powder having an average particle size of less than 0.1 µm is not preferable since it contains much impurities including oxygen. The silicon powder having an average particle size of over 150 µm is not preferable since it is not evenly dispersed in the composition. If necessary, any metallic powder such as Cu, Mg, Bi, Sb and Ba powder in an amount of about 5% by weight or less based on 100% of the total metal can be added in the mixture comprising the aluminum powder and the silicon powder. And also, if necessary, Zinc can be added in an amount of about 50% by weight or less, preferably 40% by weight or less based on 100% of the total metal (total metallic powder).

optional additives:

Known additives can be added to the flux or paste composition of the present invention. For example, an antioxidant, an anti-corrosive agent, an antifoaming agent, a thickener, a plasticizer, a dispersing agent, a tackifier, a coupling agent, a static agent (a conductivity improver) and the like can be suitably added. Particularly, a coupling agent is effective in order to improve an adhesion of a film. If the coupling agent is used, its addition of about 0.001 to 2 parts by weight with respect to 100 parts by weight of the flux is effective. When the composition of the present invention is electrostatically coated, the addition of a static agent is effective, preferably in an amount of about 0.1 to 30 parts by weight.

average thickness:

The flux composition of the present invention in a necessary amount is applied to at least a part of a surface of an aluminum brazing sheet, i.e. an area to be brazed on a surface of an aluminum brazing sheet. Average thickness of the resultant film after drying is preferably 0.5 to 50 µm, more preferably 1.5 to 20 µm. When the average thickness is less than 0.5 µm, a sufficient brazing property is not obtained due to a less amount of the flux. On the other hand, when the average thickness is over 50 µm, the resultant film has a bad appearance since excess flux is left. In addition, cogts may be increased.

Similarly, the paste composition of the present invention in a necessary amount is applied to at least a part of a surface of an aluminum material, i.e. an area to be brazed on a surface of an aluminum material. Average thickness of the film after drying is preferably 5 to 500 μm, more preferably 10 to 150 μm. When the average thickness is less than 5 μm, a sufficient brazing property is not obtained. On the other hand, when the average thickness is over 500 μm, it is a surplus leading to the increase in cost. However, when the paste composition of the present invention is used for closing holes or filling up gaps, the thickness of above 500 μm can be used.

coating method and application:

The composition of the present invention can be applied to an aluminum brazing sheet or an aluminum material by any conventional methods. For example, it can be applied using a brush, a roller coater, a bar coater, a doctor blade and the like, or according to the spray coating method or the electrostatic coating method. An aluminum brazing sheet may be simply dipped in the flux or paste composition of the present invention.

After the coating of the flux or paste composition, the resultant film is generally dried at room temperature. If necessary, the drying temperature may be about 30 to 150° C.

Any known brazing method can be employed without limiting. Preferably, the brazing is carried out in an oven or a furnace. Brazing temperature will be varied with the composition, but it is generally about 450 to 630° C. The brazing is carried out in any atmosphere, preferably vacuum, argon or nitrogen atmosphere.

The flux or paste composition of the present invention can be applied to an aluminum brazing sheet. It can be used for brazing members constituting heat exchangers such as heater cores, evaporators and condensers, for example, fins, pins, tubes, plates and the like so that the members are joined. Of course, the flux or paste composition of the present invention can be applied to various parts other than the heat exchangers, for example, various mechanical parts, structural parts, sports goods, OA appliances, household articles and the like.

EXAMPLE I

Flux compositions were prepared by mixing components according to formulations as shown in Tables I-1 and I-2. One surface of a 3003/4045 brazing sheet (60×50×2 mm) was coated with each of the thus-prepared flux compositions using a brush to prepare a film having an average dry thickness of 5 μm. Only the composition of Example 11 was applied by the liquid electrostatic coating method. Then, each sheet was heated at 105° C. for 5 minutes in order to completely evaporate toluene used as an organic solvent for dilution. The resultant coated panel were evaluated as follows:

film-forming property;

| ○ | Film was dry to the touch. |
| × | Film was not dry to the touch. | adhesion;

| A | Film was not peeled off even if rubbed with a finger vigorously. |
| B | Film was not peeled off even if rubbed with a finger lightly. |
| C | Film was peeled off by rubbing with a finger, but it was not peeled off by tapping. |
| D | Film was peeled off by tapping. |
| E | Not evaluated since no film was formed. |

Each coated panel after heating or brazing was also evaluated as follows:

residual carbon;

The coated panel was kept as it is (open condition) or while covered with an aluminum foil (close condition) in an oven at 500° C. or 530° C. under nitrogen atmosphere (nitrogen gas flow=4 Nm$^3$/h) for 5 minutes and then cooled. A brazed surface of the panel taken out of the oven was visually observed.

| A | 10 points<br>Change into dark color was not observed at all. |
| B | 7 to 9.9 points<br>Some negligible dark spots were observed. |
| C | 3 to 6.9 points<br>Dark spots were clearly observed on the surface in a proportion of less than half of the total surface. |
| D | 1 to 2.9 points<br>Dark spots were clearly observed on the surface in a proportion of more than half of the total surface. |
| E | less than 1 point<br>Panel looked dark totally. Its commercial value is null. | odor;

An odor of gas released from the oven during the heating in the residual carbon test was checked.

| A | Almost no or slight odor was detected. |
| B | Odor was detectable, but it did not affect operations. |
| C | Foreign and somewhat noticeable odor was detected. |
| D | Unpleasant odor affecting to operations was detected. |
| E | Smell was detected and operations had to be stopped. | formation of fillet (appearance);

A 3003 aluminum plate was stood perpendicularly at the center of the coated surface of the coated panel, temporarily fasten with a stainless wire, and then kept in an oven at 600° C. under nitrogen atmosphere (nitrogen gas flow=4 Nm$^3$/h) for three minutes to be brazed. After cooling, a brazed area of the panel taken out of the oven was visually observed to evaluate the formation of fillet.

| A | Fillet was satisfactorily formed. That is, the fillet was evenly formed around the brazed area. |
| B | Fillet was somewhat unevenly formed. |
| C | Fillet was very unevenly formed. |
| D | Fillet was not continuously formed. |
| E | Brazing could not effected. |

As clear from results in Tables I-1 and I-2, the brazing with the flux composition of the present invention was very satisfactory in all properties.

TABLE I-1

(Examples)

| flux composition components | 1 | 2 | 3 | 4 | 5 | 6 | 7 | 8 | 9 | 10 | 11 |
|---|---|---|---|---|---|---|---|---|---|---|---|
| | | | | | amount (parts by weight) | | | | | | |
| Nocolok FLUX[1] | 100 | 100 | 100 | 100 | 100 | 100 | 100 | 100 | 100 | 100 | 100 |
| EXXON BUTYL 268[2] | 25 | 12.5 | 5.0 | 2.5 | | | 10 | 20 | | 12.5 | 5 |
| EXXON BUTYL 365[3] | | | | | | | | | 25 | | |
| TOHO HIGHRESIN 120[4] | | | | | 25 | 5 | 2.5 | 5 | | | |
| coupling agent KR-TTS[5] | | | | | | | | | | 0.25 | |
| static agent BYK-ES80[7] | | | | | | | | | | | 10.0 |
| DISPARONE #305[6] | 2.0 | 2.0 | 2.0 | 2.0 | 2.0 | 2.0 | 2.0 | 2.0 | 2.0 | 2.0 | 2.0 |
| toluene | 80 | 80 | 80 | 80 | 80 | 80 | 80 | 80 | 80 | 80 | 400 |
| film-forming property | ○ | ○ | ○ | ○ | ○ | ○ | ○ | ○ | ○ | ○ | ○ |
| adhesion | A | B | B | B | A | B | A | A | A | A | A |
| residual carbon (open, 500° C.) | A | A | A | A | A | A | A | A | A | A | A |
| residual carbon (open, 530° C.) | A | A | A | A | A | A | A | A | A | A | A |
| residual carbon (close, 500° C.) | A | A | A | A | A | A | A | A | A | A | A |
| residual carbon (close, 530° C.) | A | A | A | A | A | A | A | A | A | A | A |
| odor on heating | A | A | A | A | B | B | B | B | B | A | A |
| fillet appearance | A | A | A | A | A | A | A | A | A | A | A |

[1] aluminum fluoride flux: manufactured by Alcan Aluminum Limited
[2] butyl rubber: manufactured by Exxon Chemical k.k.
[3] butyl rubber: manufactured by Exxon Chemical k.k.
[4] petroleum resin: manufactured by Toho Chemical Industries k.k.
[5] titanate coupling agent (adhesion improver): manufactured by Ajinomoto k.k.
[6] hydrogenated castor oil (thickener): manufactured by Kusumoto Kasei k.k.
[7] static agent (conductivity improver): manufactured by Vick-Chemi Japan k.k.

TABLE I-2

(Comparative Examples)

| flux composition components | 1 | 2 | 3 | 4 | 5 |
|---|---|---|---|---|---|
| | amount (parts by weight) | | | | |
| Nocolok FLUX [1] | 100 | 100 | 100 | 100 | 100 |
| PEO 40 [8] | 25 | | | | |
| BR-100 [9] | | 25 | | | |
| AX-2000 [10] | | | 25 | | |
| POLYBIS 30SH [11] | | | | 25 | |
| VISTANEX LM-MS [12] | | | | | 25 |
| DISPARONE #305 [6] | 2.0 | 2.0 | 2.0 | 2.0 | 2.0 |
| toluene | 80 | 80 | 80 | 80 | 80 |
| film-forming property | ○ | ○ | ○ | × | × |
| adhesion | C | A | A | C | C |
| residual carbon (open, 500° C.) | E | D | E | A | A |
| residual carbon (open, 530° C.) | E | D | E | A | A |
| residual carbon (close, 500° C.) | E | D | E | A | A |
| residual carbon (close, 530° C.) | E | D | E | A | A |
| odor on heating | B | C | C | C | A |
| fillet appearance | A | C | C | A | A |

[8] polyethylene oxide: manufactured by Sumitomo Seika k.k.
[9] acrylic resin: manufactured by Mitsubishi Rayon k.k.
[10] polyvinyl alcohol: manufactured by Nihon Gosei Kagaku Kogyo k.k.
[11] polybutene: manufactured by Nippon Oils and Fats Co.
[12] liquid polyisobutylene: manufactured by Exxon Chemical k.k.

EXAMPLE II

Paste compositions were prepared by mixing components according to formulations as shown in Tables II-1 and II-2.

One surface of a 3003 aluminum panel (60×50×2 mm) was coated with each of the thus-prepared paste compositions using a brush to prepare a film having an average dry thickness of 40 μm. Then, each panel was heated at 105° C. for 5 minutes in order to completely evaporate toluene used as an organic solvent for dilution. The resultant coated panel were evaluated as follows:

film-forming property;

| ○ | Film was dry to the touch. |
|---|---|
| × | Film was not dry to the touch. | adhesion;

| A | Film was not peeled off even if rubbed with a finger vigorously. |
|---|---|
| B | Film was not peeled off even if rubbed with a finger lightly. |
| C | Film was peeled off by rubbing with a finger, but it was not peeled off by tapping. |
| D | Film was peeled off by tapping. |
| E | Not evaluated since no film was formed. |

Each coated panel after heating or brazing was also evaluated as follows:

residual carbon;

The above coated panel was kept while covered with an aluminum foil (close condition) in an oven at 500° C. or 530° C. under nitrogen atmosphere (nitrogen gas flow=4 Nm³/h) for 5 minutes and then cooled. A brazed surface of the panel taken out of the oven was visually observed.

| | |
|---|---|
| A | 10 points |
| | Change into dark color was not observed at all. |
| B | 7 to 9.9 points |
| | Some negligible dark spots were observed. |
| C | 3 to 6.9 points |
| | Dark spots were clearly observed on the surface in a proportion of less than half of the total surface. |
| D | 1 to 2.9 points |
| | Dark spots were clearly observed on the surface in a proportion of more than half of the total surface. |
| E | less than 1 point |
| | Panel looked dark totally. Its commercial value was null. | formation of fillet (appearance);

A 3003 aluminum plate was stood perpendicularly at the center of the coated surface of the coated panel, temporarily fasten with a stainless wire, and then kept in an oven at 600° C. under nitrogen atmosphere (nitrogen gas flow=4 Nm³/h) for three minutes to be brazed. After cooling, a brazed area of the panel taken out of the oven was visually observed to evaluate the formation of fillet.

| | |
|---|---|
| A | Fillet was satisfactorily formed. That is, the fillet was evenly formed around the brazed area. |
| B | Fillet was somewhat unevenly formed. |
| C | Fillet was very unevenly formed. |
| D | Fillet was not continuously formed. |
| E | Brazing could not effected. | odor;

An odor of gas released from the oven during the heating in the residual carbon test was checked.

| | |
|---|---|
| A | Almost no or slight odor was detected. |
| B | Odor was detectable, but it did not affect operations. |
| C | Foreign and somewhat noticeable odor was detected. |
| D | Unpleasant odor affecting to operations was detected. |
| E | Smell was detected and operations had to be stopped. |

As clear from results in Tables II-1 and II-2, the brazing with the paste composition of the present invention was very satisfactory in all properties.

TABLE II-1

| | (Examples) | | | | | | | |
|---|---|---|---|---|---|---|---|---|
| paste composition components | 1 | 2 | 3 | 4 | 5 | 6 | 7 | 8 |
| | amount (% by weight) | | | | | | | |
| metallic powder for brazing (1-1) | 44.3 | 50.0 | 44.3 | 50.0 | 44.3 | 50.0 | 44.26 | |
| metallic powder for brazing (1-2) | | | | | | | | 5.3 |
| metallic powder for brazing (1-3) | | | | | | | | 37.3 |
| fluoride flux[2] | 14.8 | 16.7 | 14.8 | 16.7 | 14.8 | 16.7 | 14.8 | 18.3 |
| EXXON BUTYL 268[3] | 3.7 | 2.1 | | | | | | 3.8 |
| EXXON BUTYL 365[4] | | | 3.7 | 2.1 | | | | |
| TOHO HIGHRESIN 120[5] | | | | | 3.7 | 2.1 | | 0.8 |
| coupling agent KR-TTS[6] | | | | | | | 0.04 | |
| DISPARONE #305[7] | 0.3 | 0.3 | 0.3 | 0.3 | 0.3 | 0.3 | 0.3 | 0.3 |
| toluene | 36.9 | 30.9 | 36.9 | 30.9 | 36.9 | 30.9 | 36.9 | 34.2 |
| film-forming property | ○ | ○ | ○ | ○ | ○ | ○ | ○ | ○ |
| adhesion | A | C | A | C | A | C | A | A |
| residual carbon (close, 500° C.) | A | A | A | A | A | A | A | A |
| residual carbon (close, 530° C.) | A | A | A | A | A | A | A | A |
| odor on brazing | A | A | A | A | A | A | A | A |
| fillet appearance | A | A | A | A | A | A | A | A |

(1-1) Al-10 wt % Si alloy powder (N₂ gas atomized powder; average particle size = 30 μm; oxygen content = 0.07 wt %)
(1-2) silicon powder 301 (average particle size = 25 μm): manufactured by Alcan Aluminum Limited
(1-3) pure aluminum powder (average particle size = 8 μm; oxygen content = 0.36 wt %)
[2]"Nocolok" flux: manufactured by Alcan Aluminum Limited
[3]butyl rubber: manufactured by Exxon Chemical k.k.
[4]butyl rubber: manufactured by Exxon Chemical k.k.
[5]petroleum resin: manufactured by Toho Chemical Industries k.k.
[6]titanate coupling agent (adhesion improver): manufactured by Ajinomoto k.k.
[7]hydrogenated castor oil (thickener): manufactured by Kusumoto Kasei k.k.

TABLE II-2

| | (Comparative Examples) | | | | |
|---|---|---|---|---|---|
| paste composition components | 1 | 2 | 3 | 4 | 5 |
| | amount (% by weight) | | | | |
| metallic powder for brazing (1-1) | 44.3 | 44.3 | 44.3 | 44.3 | 44.3 |
| fluoride flux [2] | 14.8 | 14.8 | 14.8 | 14.8 | 14.8 |
| PEO 40 [8] | 3.7 | | | | |

TABLE II-2-continued (Comparative Examples)

| paste composition components | 1 | 2 | 3 | 4 | 5 |
|---|---|---|---|---|---|
| | amount (% by weight) | | | | |
| BR-100 [9] | | 3.7 | | | |
| AX-2000 [10] | | | 3.7 | | |
| POLYBIS 30SH [11] | | | | 3.7 | |
| VISTANEX LM-MS [12] | | | | | 3.7 |
| DISPARONE #305 [7] | 0.3 | 0.3 | 0.3 | 0.3 | 0.3 |
| toluene | 36.9 | 30.9 | 36.9 | 30.9 | 36.9 |
| film-forming property | ○ | ○ | ○ | × | × |
| adhesion | C | A | A | C | C |
| residual carbon (open, 500° C.) | E | C | E | A | A |
| residual carbon (open, 530° C.) | E | C | E | A | A |
| odor on heating | B | C | C | C | A |
| fillet appearance | A | C | C | A | A |

[8] polyethylene oxide: manufactured by Sumitomo Seika k.k.
[9] acrylic resin: manufactured by Mitsubishi Rayon k.k.
[10] polyvinyl alcohol: manufactured by Nippon Gosei Kagaku Kogyo k.k.
[11] polybutene: manufactured by Nippon Oil and Fats Co.
[12] liquid polyisobutylene: manufactured by Exxon Chemical k.k.

What is claimed is:

1. A method of joining an aluminum material comprising:
   (1) coating at least a part of an aluminum brazing sheet with a flux composition for brazing aluminum comprising (a) a fluoride flux, (b) at least one member selected from a butyl rubber having a molecular weight ranging from 250,000 to 550,000 and a petroleum resin, and (c) a solvent;
   (2) drying; and
   (3) joining the coated aluminum brazing sheet with the aluminum material by heating.

2. A method as claimed in claim 1 wherein the butyl rubber comprises a copolymer of isobutylene and isoprene.

3. A method as claimed in claim 1 wherein the heating is carried out in an oven.

4. A method of joining aluminum materials comprising:
   (1) coating at least a part of one of the aluminum materials with a flux composition for brazing aluminum comprising (a) a fluoride flux, (b) at least one member selected from a butyl rubber having a molecular weigh ranging 250,000 to 550,000 and a petroleum resin, (c) a solvent and (d) a metallic powder for brazing;
   (2) drying; and
   (3) joining the coated aluminum material with another aluminum material by heating.

5. A method as claimed in claim 4 wherein the heating is carried out in an oven.

* * * * *